United States Patent
Huang et al.

(10) Patent No.: US 10,241,389 B2
(45) Date of Patent: Mar. 26, 2019

(54) DEVICE FOR TESTING FISH-EYE CAMERA

(71) Applicant: HON HAI PRECISION INDUSTRY CO., LTD., New Taipei (TW)

(72) Inventors: Chun-Yao Huang, New Taipei (TW); Jheng-Jie Jhou, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/672,385

(22) Filed: Aug. 9, 2017

(65) Prior Publication Data
US 2019/0004415 A1 Jan. 3, 2019

(30) Foreign Application Priority Data

Jun. 30, 2017 (CN) .......................... 2017 1 0524512

(51) Int. Cl.
*G03B 43/00* (2006.01)
*G02B 13/06* (2006.01)

(52) U.S. Cl.
CPC ............. *G03B 43/00* (2013.01); *G02B 13/06* (2013.01)

(58) Field of Classification Search
CPC .......... G02B 7/02; G02B 7/021; G02B 7/022; G02B 7/023; G02B 7/026
USPC ......................................................... 359/808
See application file for complete search history.

(56) References Cited

U.S. PATENT DOCUMENTS

| | | | |
|---|---|---|---|
| 7,679,671 B2 * | 3/2010 | Tanaka | G03B 15/03 348/370 |
| 2009/0290341 A1 * | 11/2009 | Chang | G02B 3/005 362/235 |
| 2015/0171236 A1 * | 6/2015 | Murray | H01L 31/02325 250/208.1 |

* cited by examiner

*Primary Examiner* — Mohammed A Hasan
(74) *Attorney, Agent, or Firm* — ScienBiziP, P.C.

(57) ABSTRACT

A test device for the image-capturing ability of a fish-eye camera comprises a test box, an image test console carrying the fish-eye camera, a light plate on the image test console to cover the fish-eye camera, and a plurality of light source plates in the test box, surrounding the image test console and the light plate. The light plate further comprises a cap, the cap being a hollow hemisphere.

11 Claims, 4 Drawing Sheets

DEVICE FOR TESTING FISH-EYE CAMERA

FIELD

The subject matter relates to a test device, and more particularly, to a test device for a fish-eye camera.

BACKGROUND

An image test devices can test cameras. Such an image testing device comprises a light-diffusing flat plate which covers the camera to test the light uniformity effect. Fish-eye cameras have field of view (FOV) greater than or equal to 180 degrees. Since the flat light diffusion plate cannot completely cover the FOV of the fish-eye camera, the image testing device cannot be used to test the fish-eye cameras.

BRIEF DESCRIPTION OF THE DRAWINGS

Implementations of the present technology will now be described, by way of example only, with reference to the attached figures, wherein.

DETAILED DESCRIPTION

Figure 1:
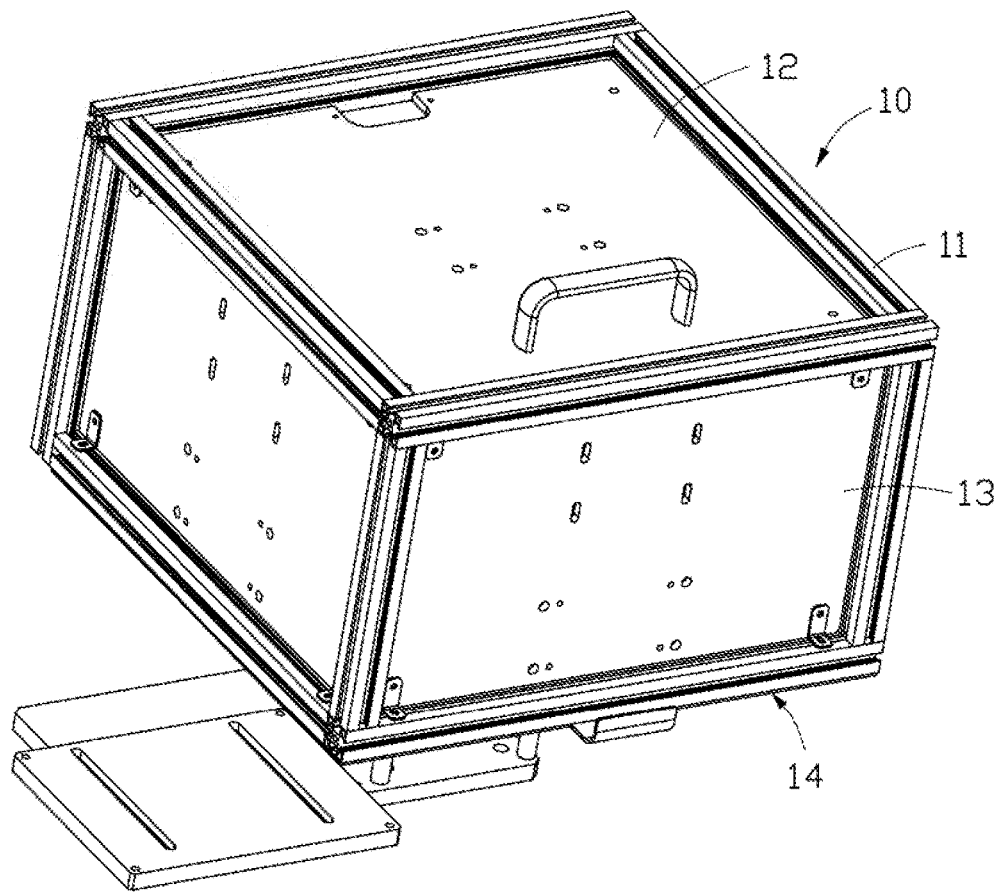
FIG. 1 is a view of an exemplary embodiment of an image test device for fish-eye camera.
Figure 2:
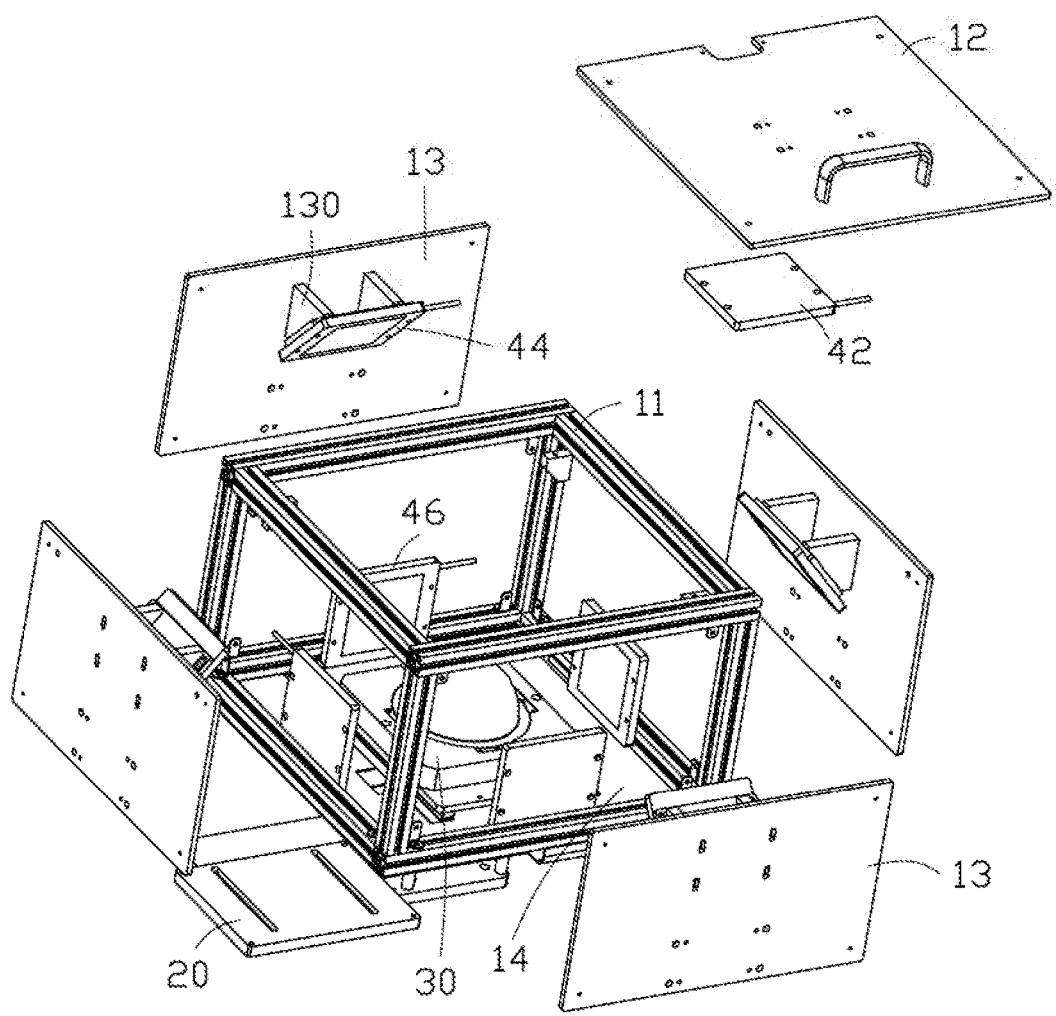
FIG. 2 is an exploded view of the image test device of FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details.

In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

One definition that applies throughout this disclosure will now be presented.

The term "substantially" is defined to be essentially conforming to the particular dimension, shape, or other feature that the term modifies, such that the component need not be exact. For example, "substantially rectangular" means that the object resembles a rectangle, but can have one or more deviations from a true rectangle.

The term "comprising," when utilized, means "including, but not necessarily limited to"; it specifically indicates open-ended inclusion or membership in the so-described combination, assembly, series, and the like.

Referring to FIGS. 1 to. 2, an image test device 100 for fish-eye cameras comprises a test box 10, an image test console 20 received in the test box 10, a light diffusion plate 30 positioned on the image test console 20, and a plurality of light source plates 40.

The test box 10 is cubic. The test box 10 comprises a frame 11, an upper cover 12, four side walls 13, and a bottom plate 14. The frame 11 is a hollow cube. The upper cover 12 is connected to a top of the frame 11. The four side walls 13 have a same shape and size. The four side walls 13 are connected to four sides of the frame 11. The four side walls 13 are perpendicular to the upper cover 12. Each two adjacent side walls 13 are perpendicular to each other, and each two opposite side walls 13 are parallel to each other. A support block 130 is fixed to an inner side of each side walls 13. The support block 130 is shaped as a right-angle triangular prism. The support block 130 is positioned near the upper cover 12. One right-angle surface of the support block 130 is fixed to the inner side of the side wall 13, and the other right-angle surface is parallel to the upper cover 12. The bottom plate 14 is connected to a bottom of the frame 11. The bottom plate 14 is parallel to the upper cover 12. A through groove 140 (shown in FIG. 4) is defined in the bottom plate 14.

Figure 3:
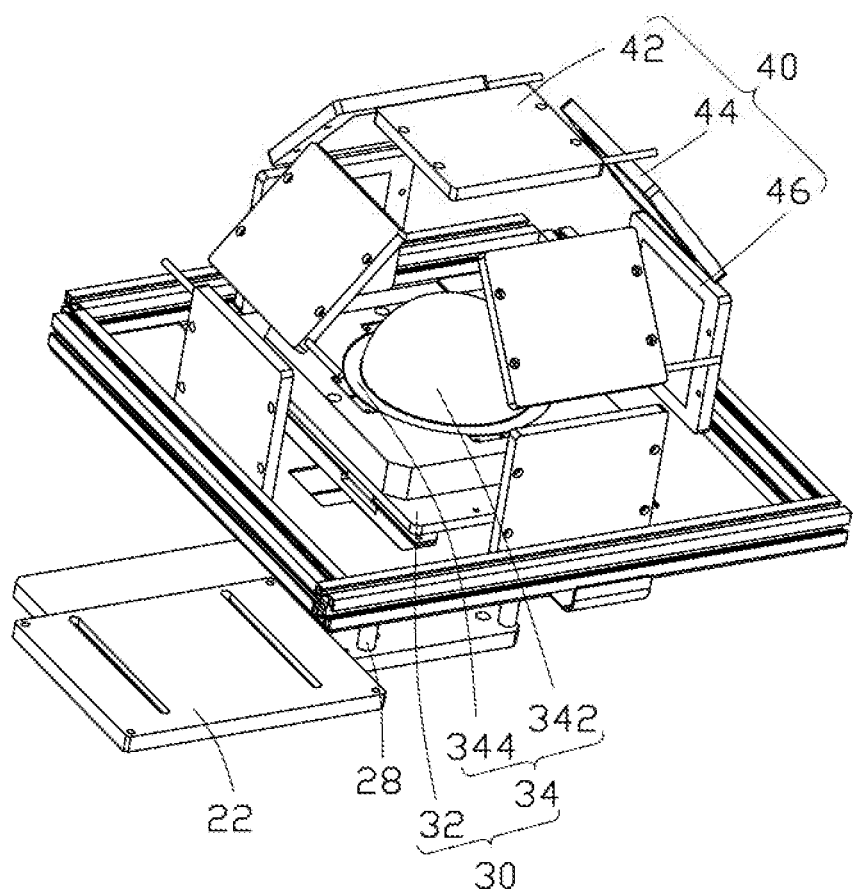
FIG. 3 is a view showing an image test console of the device of FIG. 1 surrounded by a plurality of light source plates.
Figure 4:
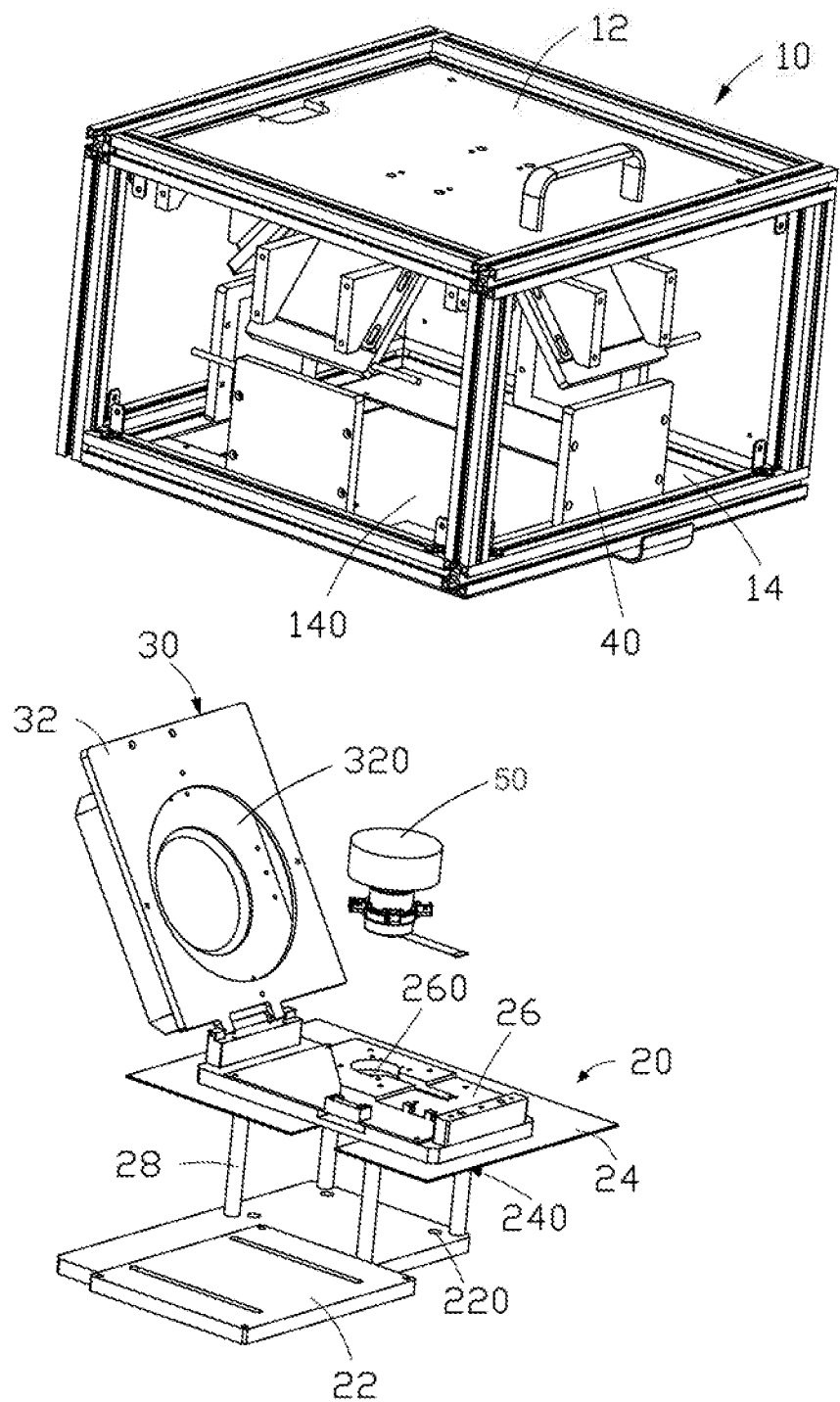
FIG. 4 is another exploded view of the device of FIG. 1.

Referring to FIGS. 3 and 4, the image test console 20 comprises a substrate 22, a flat plate 24, a test bench 26, and four posts 28. The substrate 22 is substantially cubic. The substrate 22 comprises four first mounting holes 220. The four first mounting holes 220 are positioned adjacent to an edge of the substrate 22. In the exemplary embodiment, the four first mounting holes 220 are arranged in an array. The flat plate 24 has a same size and shape as those of the through groove 140. Four second mounting holes 240 are defined in the flat plate 24. The flat plate 24 is fixed on the substrate 22 by the posts 28. The four second mounting holes 240 correspond to the four first mounting holes 220. The test bench 26 is fixed on the flat plate 24. A groove 260 is defined in the test bench 26. The groove 260 is positioned at the center of the test bench 26. The groove 260 can be used to receive a fish-eye camera 50 to be tested. The four second mounting holes 240 surround the groove 260. When in use, the flat plate 24 is received and fixed in the through groove 140, so that the test bench 26 is completely accommodated in the test box 10.

The light diffusion plate 30 comprises a cover 32 and a cap 34. The cover 32 is cubic. A through hole 320 is defined in the cover 32. The cap 34 is positioned on the cover 32 and covers the through hole 320. In the exemplary embodiment, the cap 34 is a hollow hemisphere which can completely cover the field of view of the fish-eye camera 50 to test the image-capturing ability of the fish-eye camera 50. The cover 32 has a same size as that of the test bench 26. One end of the cover 32 is pivotally connected to the test bench 26. In the exemplary embodiment, the through hole 320 is a stepped hole. The cap 34 comprises a hemispherical portion 342 and an annular portion 344. The annular portion 344 surrounds the edge of the hemisphere portion 342. The annular part 344 is embedded and fixed in the through hole 320. The hemispherical part 342 is positioned above the groove 260.

The light source plates 40 are received in the test box 10. The light source plates 40 surround the test bench 26 and the light diffusion plate 30 to generate a stable light illuminating interior of the test box 10. In the exemplary embodiment, the number of the light source plates 40 is nine. The light source plates 40 are positioned at the inner surface of the upper cover 12, the four side walls 13, and the bottom plate 14. The nine light source plates 40 comprise a first light source plate 42, four second light source plates 44, and four third light source plates 46. The first light source plate 42 is positioned at the center of the inner side of the upper cover 12. Each second light source plate 44 and each third light source plate 46 is positioned at the inner surface of the one side wall 13. Each second light source plate 44 is inclined with respect to the side wall 13. Each third light source plate 46 is parallel to the side wall 13. Each of the third light source plates 46 can be fixed to the corresponding side wall 13 by screws (not shown). Each second light source plate 44 is positioned on the side wall 13 by the support block 130, and each second light source plate 44 is positioned between the first light source plate 42 and the third light source plate 46. One end of the second light source plate 44 points to one end of the first light source plate 421, and the other end of the second source plate 44 points to one end of the third light plate 46. In other exemplary embodiments, the number of the first light source plate(s) 42, the second light source plate(s) 44, and the third light source plate(s) 46 can be adjusted according to the size of the light diffusion plate 30.

Referring to FIG. 4, when in use, the light diffusion plate 30 is rotated relative to the image test console 20 to uncover the light diffusion plate 30, so that the fish-eye camera 50 can be fixed to the test bench 26. Then, the cover 32 covers the test bench 26 and the cap 34 is positioned above the fish-eye camera 50, so that the field of view of the fish-eye camera 50 is completely covered by the cap 34. Then, the image test console 20 and the light diffusion plate 30 are loaded into the test box 10.

The image test device 100 comprises a light diffusion plate 30 and a plurality of light source plates 40. The light diffusion plate 30 comprises a cap 34. The cap 34 is a hollow hemisphere which can completely cover the field of view of the fish-eye camera 50 to test the image-capturing ability of the fish-eye camera 50. The light source plates 40 generate a stable illumination in the image test device 100. The image test device 100 has a low cost and can be easily manufactured, which can be used in a mass production test of fish-eye cameras 50.

The embodiment shown and described above is only an example. Many details are often found in the art such as the other features of the street lamp. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A device for testing a fish-eye camera comprising:
   a test box;
   an image test console received in the test box to support the fish-eye camera;
   a light diffusion plate positioned on the image test console to cover the fish-eye camera, the light diffusion plate comprising a cap, the cap being hollow hemisphere;
   a plurality of light source plates received in the test box and surrounding the image test console and the light diffusion plate.

2. The device of claim 1, wherein the light diffusion plate further comprises a cover, the cover defines a through hole, the cap is positioned on the cover and covers the through hole.

3. The device of claim 2, wherein the image test console comprises a test bench, the cover is pivotally connected to the test bench.

4. The device of claim 1, wherein the test box is cubic.

5. The device of claim 4, wherein the test box comprises a frame, an upper cover, four side walls, and a bottom plate, the upper cover is connected to a top of the frame, the four side walls are connected to four sides of the frame, and the bottom plate are connected to a bottom of the frame.

6. The device of claim 5, wherein the plurality of light source plates comprises at least one first light source plate, at least one second light source plate, and at least one third light source plate, the at least one first light source plate is positioned at the upper cover, the at least one second light source plate and the at least one third light source plate are positioned at an inner surface of the each of the side walls.

7. The device of claim 6, wherein the at least one second light source plate is inclined with respect to each of the side walls, and is positioned between one first light source plate and one third light plate.

8. The device of claim 4, wherein a through groove is defined in the bottom plate.

9. The device of claim 8, wherein the image test console further comprising a flat plate, and the flat plate is received and fixed in the through groove.

10. The device of claim 9, wherein the image test console further comprises a substrate, and the flat plate is fixed on the substrate by a plurality of posts.

11. The device of claim 1, wherein a groove is defined in the image test console to receive the fish-eye camera.

* * * * *